Nov. 15, 1955 A. HALLUM 2,723,495
SOIL WARMING DEVICE
Filed Dec. 5, 1951 3 Sheets-Sheet 1

INVENTOR.
Andrew Hallum,
BY Victor J. Evans & Co.
ATTORNEYS

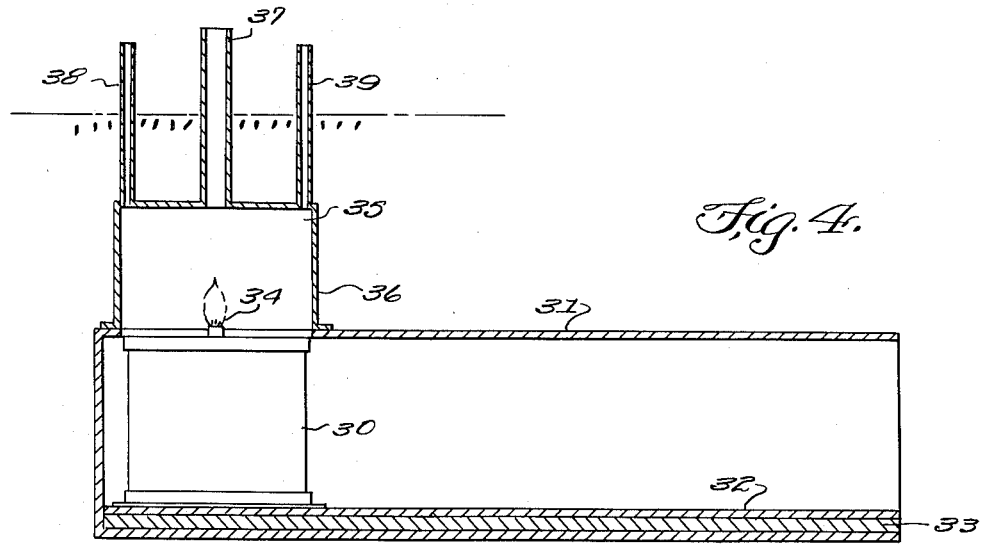
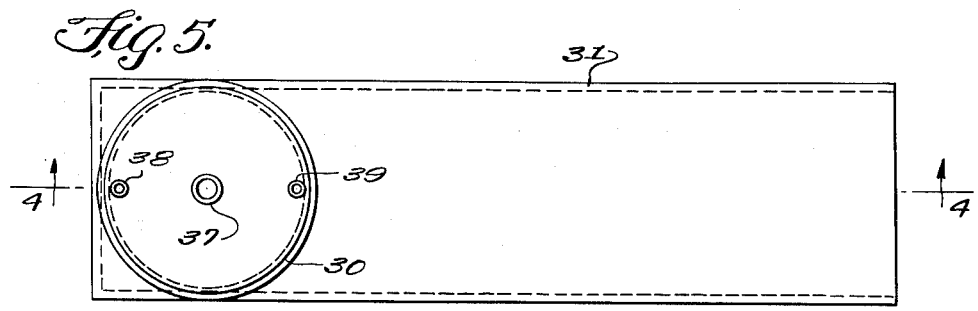
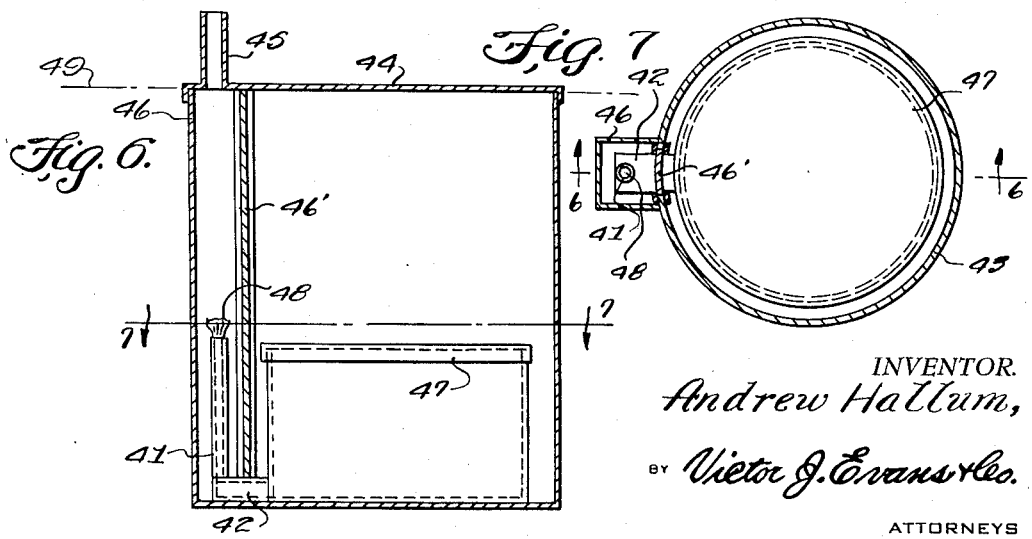

Nov. 15, 1955 A. HALLUM 2,723,495
SOIL WARMING DEVICE
Filed Dec. 5, 1951 3 Sheets-Sheet 3
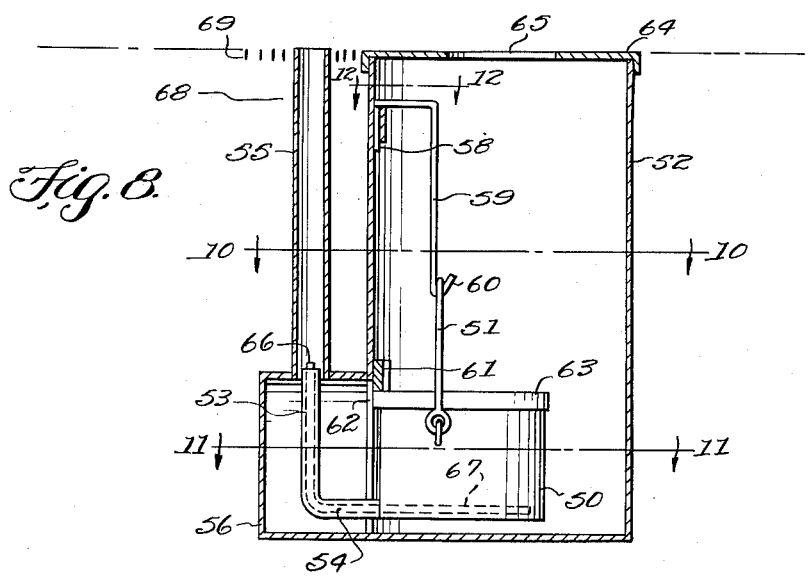
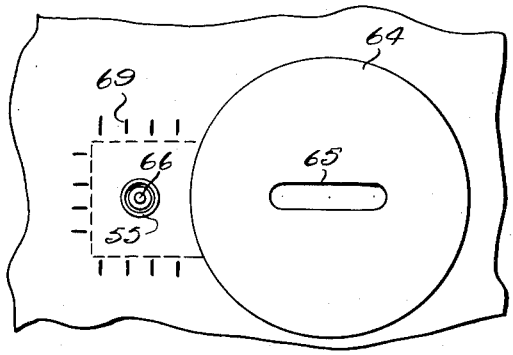
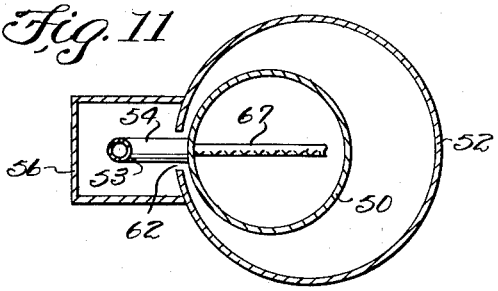
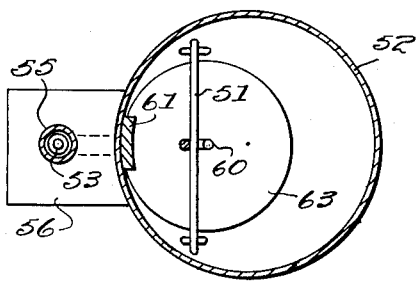
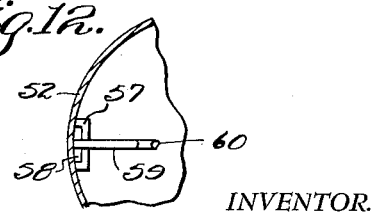
INVENTOR.
Andrew Hallum,
BY Victor J. Evans & Co.
ATTORNEYS

United States Patent Office 2,723,495
Patented Nov. 15, 1955

2,723,495

SOIL WARMING DEVICE

Andrew Hallum, Waterloo, Iowa

Application December 5, 1951, Serial No. 260,022

3 Claims. (Cl. 47—19)

This invention relates to seed starting devices particularly adapted for starting seeds such as melon, squash, pumpkin and cucumbers, and in particular a heater having an oil burner positioned in a casing adapted to be substantially buried in the ground, whereby heat is supplied to a hill or the like in which seeds may be placed.

The purpose of this invention is to expedite the growth of melons and similar products of the type having seeds that freeze readily so that as soon as all danger of frost has passed the young plants are ready to grow without being transplanted.

Various methods have been used for sprouting seeds and expediting the growth of plants. However with plants that are not adapted to be transplanted it is difficult to start the growth until all danger of frost is passed. With this thought in mind this invention contemplates a device for applying heat to soil from below whereby the heat permeates through the soil providing a warm bed for the incubation period of the seeds.

The object of this invention is, therefore, to provide means for supplying continuous slow heat to an area of soil such as a hill prepared for seed wherein the heat is applied below the surface of the ground.

Another object of the invention is to provide a heater adapted to be substantially buried in the ground which is adapted to operate continuously over a comparatively long period of time.

A further object of the invention is to provide a soil heater adapted to be positioned in the ground which is of a simple and economical construction.

With these and other objects and advantages in view the invention embodies a wick extended from a fuel tank with a housing substantially surrounding the tank and with a burning area around the end of the wick.

Other features and advantages of the invention will appear from the following description taken in connection with the drawings, wherein:

Figure 4 is a view showing a longitudinal section similar to that shown in Figure 1, illustrating a modification wherein the combustion chamber is provided with a plurality of outlets, said section being taken on line 4—4 of Figure 5.

Figure 5 is a plan view of the heater shown in Figure 4.

Figure 6 is a longitudinal section taken on line 6—6 of Figure 7 illustrating a further modification wherein a wick retaining tube extends from one side of the tank.

Figure 7 is a sectional plan taken on line 7—7 of Figure 6.

Figure 8 is a longitudinal section similar to that shown in Figure 6 illustrating a further modification wherein an oil tank with a wick tube extended from one side is suspended in an elongated vertically disposed housing.

Figure 9 is a plan view of the burner shown in Figure 8.

Figure 10 is a sectional plan taken on line 10—10 of Figure 8.

Figure 11 is a similar sectional plan taken on line 11—11 of Figure 8.

Figure 12 is a detail showing a section taken on line 12—12 of Figure 8, illustrating a T-shaped bracket for supporting the oil tank.

Figure 1:
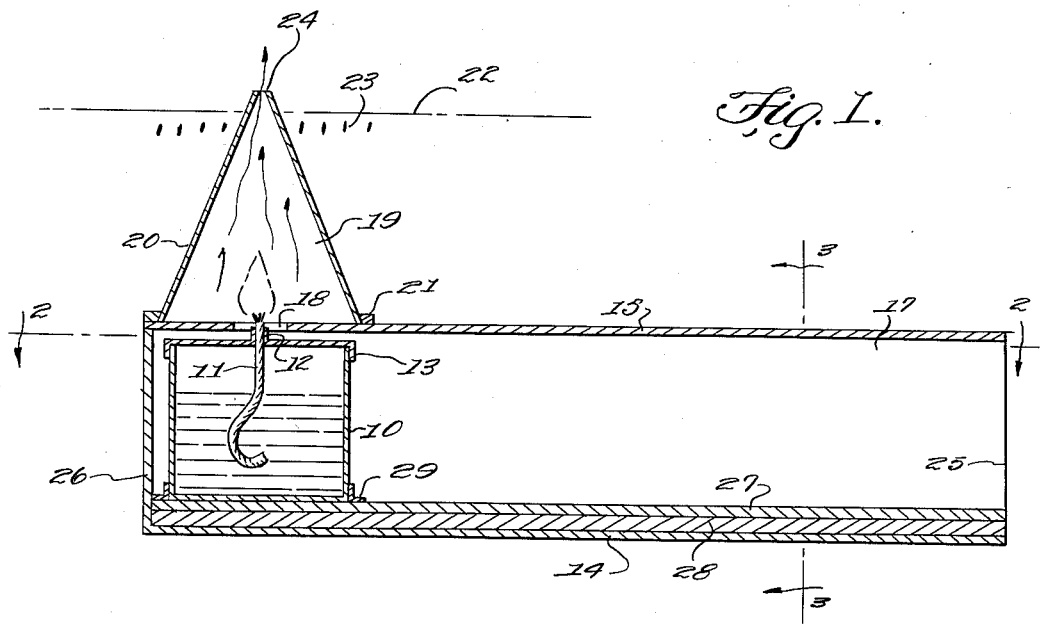
Figure 1 is a longitudinal section through a soil heating burner showing a wick positioned directly in a fuel tank with an extended end of the wick positioned in a conical shaped combustion chamber and with the tank positioned in a tunnel like housing.
Figure 2:
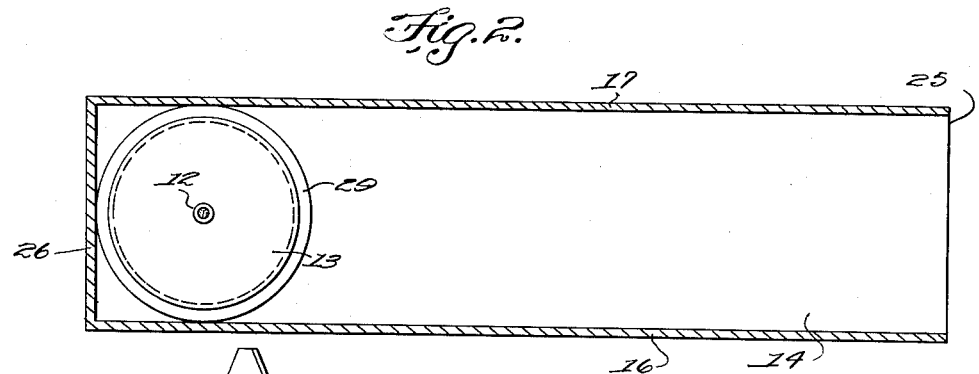
Figure 2 is a sectional plan through the housing of the burner shown in Figure 1 with the fuel tank shown in elevation, said section being taken on line 2—2 of Figure 1.
Figure 3:
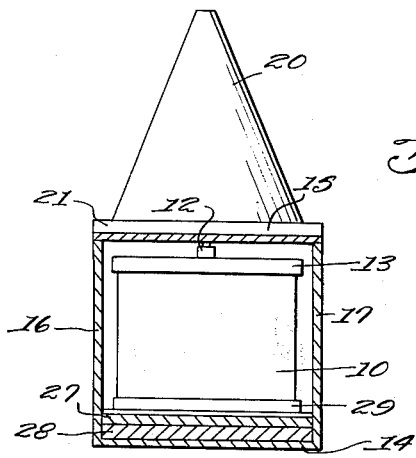
Figure 3 is a cross section through the furnace taken on line 3—3 of Figure 1.

Referring now to the drawings wherein like reference characters denote corresponding parts the improved soil warming burner of this invention includes, as illustrated in Figures 1, 2 and 3, a fuel tank 10 having a wick 11 extended through a nipple 12, extended from a cover 13, and the tank is positioned in an elongated housing having a base 14, a cover 15, and side walls 16 and 17 and, as illustrated in Figure 1, the wick 11 extends through an opening 18 in the cover 15 and into a combustion chamber 19 provided in a conical shaped member 20.

The lower end of the member 20 is provided with a flange 21 by which it is mounted on the cover 15 of the housing and with the parts assembled as shown a flame from the wick 11 provides heat in the chamber 19 and a comparatively slow heat is transmitted to an area 22 in the soil around the cone 20 in which seed, as indicated by the numeral 23 may be positioned.

The upper end of the member 20 is open providing an outlet 24 for the gases of combustion and the end 25 of the housing is open to provide passage of air which supplies oxygen for combustion.

The opposite end of the housing is provided with a closure plate 26 and panels 27 and 28 are provided in the housing to provide supporting means for the tank 10. The panel 27 is drawn outwardly to carry the tank for refilling and also for adjusting the wick and the panel 28 provides a spacer for elevating the wick to the desired position in the opening 18.

In the design shown, the base of the tank is surrounded by an annular flange 29 which is secured to the inner end of the uppermost panel 27, however, it will be understood that the tank may be of any suitable design.

In the design illustrated in Figures 4 and 5 the tank 30, similar to the tank 10 is positioned in an elongated housing 31 wherein the tank is mounted on a panel 32 and a spacing panel 33 is provided below the panel 32 for adjusting the elevation of the tank.

In this design the tank 30 is provided with a wick 34 that extends into a combustion chamber 35 in a cylindrical housing 36 and, as shown in Figure 4 the housing 36 is provided with a chimney or outlet tube 37 with auxiliary outlet tubes 38 and 39 at the sides.

In this design the housing 31 is buried in the soil, similar to the housing shown in Figure 1 and heat from the wick 34 burning in the chamber 35 is supplied to the ground through the tubes 37, 38 and 39.

In the design illustrated in Figures 6 and 7 a fuel tank 40 which is provided with a wick tube 41 that is mounted on a tubular arm 42 extended from one side of the tank, is positioned in a housing 43 having a cover 44 and the cover is provided with an outlet tube 45.

The wick tube 41 is positioned in an extension 46 positioned on one side of the housing 43 and the burning end of the wick is separated from the fuel tank 40 by a laminated partition 46' provided between the housing and the extension. The fuel tank 40 is provided with a cover 47 and, as shown in Figure 6, a wick 48 extended from the end of the tube 41 burns directly below the tube 45 providing heat in an area 49 in the soil around the tube.

With the tank 40 filled with fuel such as oil, and with the wick extended into the tank or downwardly through the tube 41 a small flame is provided continuously until fuel in the tank is exhausted.

In the design illustrated in Figures 8 to 12 inclusive, a tank 50 having a bail 51 is positioned in a housing 52 and a wick tube 53 which is connected to one side of the tank 50 by connection 54 provides a burner and with the burner positioned in the lower end of a tube 55 extended upwardly from a section 56 at one side of the housing 52 heat will be supplied to soil around the upper end of the tube 55.

The housing 52 is provided with a socket 57 in which a tongue 58 of a bracket 59 is positioned and the bracket is provided with a hook 60 over which the bail 51 of the tank 50 is placed.

The housing 52 is provided with a liner or block 61 which provides a closure for a slot 62 through which the connection 54 of the tube 53 extends.

The tank 50 is provided with a cover 63 and a similar cover 64 having an elongated slot 65 therein is positioned on the housing 52.

The device is provided with a wick 66 which is held in a tube 53, and, as shown in Figure 8 the inner end 67 of the wick extends into the tank 50 as indicated by the dotted lines.

With the parts arranged in this manner the tank 50 with the wick tube may be removed, refilled, and replaced and with continuous burning of the wick at the end of the tube 53 heat is supplied to soil in an area 68 around the upper end of the tube 55 and seed, as indicated by the numeral 69, positioned in this area will be provided with heat.

With fuel or oil supplied to the burner from the tank of the different designs, the burners may burn continuously supplying heat to soil having seeds therein during the incubation period and these burners may be adjusted to supply heat until all danger of frost or of the ground being chilled is past.

What is claimed is:

1. In a soil warming device, a housing adapted to be embedded in a hill having germinating seeds therein and including a horizontally disposed base and vertically disposed side walls, a plate closing one end of said housing, a horizontally disposed cover mounted on said housing, a pair of horizontally disposed superimposed panels removably supported on said base and extending longitudinally through said housing, a fuel tank positioned on the inner end of the upper one of said panels, a nipple mounted on the upper end of said tank, a wick extending through said nipple and into said tank, there being an opening in said cover above said wick, and a flue positioned over said opening and supported on said cover.

2. The apparatus as described in claim 1, wherein said flue has a conical shape, and wherein the lower end of said flue is of greater diameter than the upper end thereof, the upper end of said flue being open and projecting above ground level.

3. A soil warming device comprising a housing rectangular in cross section adapted to be embedded in a hill having germinating seeds therein and including a horizontally disposed base and vertically disposed side walls, a vertically disposed plate closing the inner end of said housing and arranged at right angles to said base, a horizontally disposed cover mounted on said housing and arranged in spaced parallel relation above said base, a pair of horizontally disposed superimposed panels removably supported on said base and extending longitudinally through said housing, said panels having the same length as said base, a fuel tank positioned on the inner end of the upper one of said panels, an annular flange extending around the lower end of said tank and secured to the inner end of the uppermost of said panels for positioning the tank, the inner ends of said panels abutting said plate, a nipple mounted on the upper end of said tank, a wick extending through said nipple and into said tank, there being an opening in said cover directly above said wick, and a flue positioned over said opening and supported on said cover, said flue having a conical shape, the lower end of said flue being of greater diameter than the upper end thereof, the upper end of said flue being provided with an opening registering with the opening in said cover and said flue projecting above ground level, and an annular flange surrounding the outer lower end of said flue and abutting said cover.

References Cited in the file of this patent

UNITED STATES PATENTS

| | | |
|---|---|---|
| 323,151 | Horner | July 28, 1885 |
| 810,835 | Austin | Jan. 23, 1906 |
| 1,077,324 | Williams | Nov. 4, 1913 |
| 1,160,853 | Cook | Nov. 16, 1915 |
| 2,148,991 | Lenmor | Feb. 28, 1939 |
| 2,297,059 | Hegeman | Sept. 29, 1942 |
| 2,415,131 | Greenfield | Feb. 4, 1947 |
| 2,530,473 | Lebus | Nov. 21, 1950 |
| 2,609,641 | Hallum | Sept. 9, 1952 |

FOREIGN PATENTS

| | | |
|---|---|---|
| 19,846 | Great Britain | Oct. 24, 1896 |